United States Patent [19]
Claassen et al.

[11] Patent Number: 6,028,962
[45] Date of Patent: *Feb. 22, 2000

[54] SYSTEM AND METHOD FOR VARIABLE ENCODING BASED ON IMAGE CONTENT

[75] Inventors: Stuart L. Claassen, Santa Clara; Kok S. Chen, Sunnyvale; Riaz A. Moledina, Woodside, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/644,354

[22] Filed: May 10, 1996

[51] Int. Cl.[7] ................................................. G06K 9/36
[52] U.S. Cl. ......................... 382/239; 382/232; 348/390; 358/261.1
[58] Field of Search .................................... 382/232, 239; 358/261.1; 348/390, 411; 345/434

[56] References Cited

U.S. PATENT DOCUMENTS

| | | | |
|---|---|---|---|
| 4,546,385 | 10/1985 | Anastassiou | 348/390 |
| 4,568,983 | 2/1986 | Bobick | 358/260 |
| 4,668,995 | 5/1987 | Chen et al. | 358/282 |
| 5,408,542 | 4/1995 | Callahan | 382/232 |
| 5,592,297 | 1/1997 | Van Dorsselaer | 358/261.1 |

*Primary Examiner*—Jose L. Couso
*Assistant Examiner*—Anh Hong Do
*Attorney, Agent, or Firm*—Burns, Doane, Swecker & Mathis LLP

[57] ABSTRACT

A system and method for efficient image encoding begins by loading a series of image blocks. A current block is compared with an immediately preceding image block for coincidence, and coded as matching or nonmatching based on the comparison results. The system further compares the nonmatching image blocks with a stack containing a list of the most recently encountered image blocks. Image blocks matching an entry in the list are coded by reference to the appropriate entry in the list. In the event a match is still unavailing, the system determines if the image blocks may be categorized as a bilevel text block, a bilevel image block, a block containing only one gray pixel, or a block containing multiple gray pixels. Each nonmatching block is classified according this classification criteria.

37 Claims, 6 Drawing Sheets

| Current Step rate | Match CV*10 8 6 | Encoding | New Step rate |
|---|---|---|---|
| 6 → | 0 0 0 0<br>0 0 0 1<br>0 0 1 X<br>0 1 X X<br>1 X X X | No change<br>No change<br>Lower<br>Higher<br>No Change | 6<br>6<br>8<br>10<br>6 |
| 8 → | 0 0 0 0<br>0 0 0 1<br>0 0 1 X<br>0 1 X X<br>1 X X X | No change<br>Lower<br>No change<br>Higher<br>No Change | 8<br>6<br>8<br>10<br>8 |
| 10 → | 0 0 0 0<br>0 0 0 1<br>0 0 1 X<br>0 1 X X<br>1 X X X | No change<br>Lower<br>Higher<br>No change<br>No Change | 10<br>6<br>8<br>10<br>10 |

FIG. 4

SYSTEM AND METHOD FOR VARIABLE ENCODING BASED ON IMAGE CONTENT

BACKGROUND OF THE INVENTION

1. Field of the Invention

This invention generally relates to the encoding of digital data for efficient transmission or storage. The encoding scheme may be used in conjunction with a printer or like device.

2. Description of the Prior Art

Data compression is commonly used in digital systems to reduce the quantity of bits required to represent digital data. Specifically, data compression may be employed to store digital data using less memory space, or to transmit digital data more quickly. Data compression is especially prevalent in the processing of digital images due the large volume of information involved.

Digital images typically consist of bilevel or multilevel data, or a combination of both. Each pixel value within an image containing bilevel data may be represented using one bit, which may assume a value of 1 or 0. For example, graphics, text, and half-tone images may be represented using bilevel data. Multilevel data (or gray-level data) consists of pixels which may assume more than two values. Accordingly, each gray-level pixel usually requires a plurality of bits for its representation. For example, three bits may be used to represent the gray level of a pixel. As used herein, the term "bilevel text" refers to text data and text-like data, such as graphical art. The term "bilevel image" refers to bilevel half-toned image data and half-tone-like image data.

A number of compression techniques exist in the art to condense images. Among the most simple technique for compressing bilevel images is known as White Block Skipping. In this technique, each image is broken into a series of blocks of M×N pixels. If all of the pixels are white, the block is coded by 0. If the block contains at least one black pixel, the block is coded by 1. In the former case, only a 0 is transmitted, whereas in the latter case, the entire block of values has to be transmitted. A somewhat more complex version of this scheme is discussed by M. Kunt in "Source coding of X-ray Pictures," *IEEE trans. on Biomedical Engineering*, vol. BME-25, no. 2, March 1978, p. 124. Here, an M×N block of 0s is coded as a 0, while a block of 1s is coded as 11. Blocks comprising a combination of 1s and 0s are coded as 10, followed by the specific entries in the block.

Another common technique for compressing bilevel images is run length coding. In this technique, a string of 0s bracketed by two 1s is coded by specifying the length of the string of 0s, as opposed to transmitting every 0 bit. This technique is best suited for coding of bilevel text and graphics in which large runs of white space (coded as 0s) are expected. In such a circumstance, the probability of encountering a 0 is nearly unity.

Run length coding has been improved by another well-known technique, referred to as Huffman coding. In this technique, codes are assigned to different run lengths using a binary tree in such a manner that the most-frequently encountered run lengths are assigned the shortest codes. In practice, Huffman coding typically employs a look-up table storing the previously encountered run lengths and their corresponding codes. In the case of a match between a newly encountered run length and a previously encountered run length, the corresponding code is substituted for the run length in the output data stream. Further compression may be achieved by transmitting a pointer to the appropriate entry in the look-up table, instead of the Huffman code. This technique, referred to as Lempel-Ziv compression, is exemplified in U.S. Pat. No. 4,464,650.

In most instances, the above identified compression techniques are specifically tailored to process a particular type of image, such as a bilevel image. And in fact, these compression techniques perform well so long as they are fed images which they were designed to handle. Yet significant problems occur when a data compression technique designed to process a particular type of image is fed a "foreign" type of image. This problem may arise, for example, when a raw image document contains a mixture of different types of images.

For instance, if the image contains a mixture of bilevel text and multilevel image, the prior art may process the entire image as a multilevel image for sake of simplicity. The resultant coding may be needlessly lengthy, especially if significant portions of the image comprise bilevel information (which optimally may be represented using one bit for each pixel).

In the case of images containing a mixture of bilevel text and bilevel half-tone image data, applying a single compression algorithm may prove equally as inefficient. For instance, run length coding will typically provide efficient coding of the bilevel text portion, but not the half-tone portion. Run length coding is ill-equipped to handle the short run lengths prevalent in half-tone images. Huffman coding may also be inappropriate for compressing half-tone images. Notably, as discussed above, Huffman encoding employs a table containing entries representative of the most frequently encountered image data, sometimes derived from a series of test documents. When the encoding algorithm encounters a "foreign" image, the encoding may produce an output stream which actually contains more bits than the original raw image data. The document may in fact be expanded, rather than compressed.

SUMMARY OF THE INVENTION

Accordingly, it is an object of the invention to efficiently compress images which may contain portions with dissimilar image content.

Another object of the invention is to efficiently encode document images which may contain bilevel text, graphics, half-tone images, as well as multilevel image data.

Another object of the invention is to discriminate blocks of image data (hereinafter referred to as "windows") containing bilevel text, bilevel images, a single gray pixel, or multiple gray pixels, and code each window accordingly.

Still another object of the invention is to encode images containing mixed image content using Huffman coding in conjunction with stack-based tables storing a list of the most recently encountered image data.

In accomplishing these and other objectives, the present invention employs an encoding scheme which begins by dividing an image into a plurality of image groupings, referred to as windows. Each window is further broken down into four quadrants. According to a particularly advantageous feature of the present invention, each quadrant is separately coded based on its image content, thereby assigning the most efficient code to each respective image portion.

More specifically, the quadrant is first examined to determine if it contains all bilevel text data. If so, the quadrant is coded as "bilevel text", followed by one bit for each bilevel (black or white) text pixel. Similarly, if a window contains only bilevel image codes (for example, representing bilevel graphics or half-tones images) it is coded as a "bilevel image", accompanied by a one bit definition of each pixel.

However, if it is determined that the quadrant contains one gray pixel, the quadrant is coded as a "one gray image", accompanied by the one-bit codes of any bilevel pixels in the quadrant. The gray-level pixel is specified by giving an index corresponding to its location in the quadrant, as well as its value. If more than one gray pixel exists in a window, it quickly becomes more efficient to encode the window as a "multi-gray image" window followed by all of the values that define the pixels.

In another embodiment, the above described classification may be embedded in a larger compression algorithm which uses a combination of Huffman encoding and stack-based tables. According to this exemplary embodiment, the encoding scheme begins by successively stepping an M×N window through a buffer of image data. As the window is moved through the image, the contents of a current window are compared to the contents of an immediately preceding window. More particularly, the window is divided into quadrants, and each quadrant of the current window is compared with its counterpart quadrant in the previous window. Based on the comparison, a Quad Match bit is set to reflect whether a match has occurred. If a Quad Match bit indicates a match has occurred, the corresponding quadrant pixels do not have to be included in the transmitted data stream.

If a quadrant does not match its counterpart from the immediately preceding window, it may nonetheless have been used within some prior window. Accordingly, the encoding scheme next examines a stack-based table including a list of the most recently used image data. The table contains separate entries for different quadrants. If a current quadrant matches an entry at the "top" of the stack-based table, it is assigned a short code which corresponds to the position of the matching entry in the table. Matches occurring further down in the table are coded with a prefix followed by a four bit number giving the stack index.

If the above comparison fails to produce a match, the quadrants are then examined according to the above described classification scheme to discriminate whether it is a bilevel text window, bilevel image window, one gray level window or multiple gray level window.

BRIEF DESCRIPTION OF THE DRAWINGS

These and other objects and feature of the invention will become more apparent from the ensuing discussion, in conjunction with the accompanying drawings. Like numerals designate like parts or steps.

FIG. 4 provides a truth table outlining the manner of changing a step rate in response to comparison of image blocks at step rates of 6, 8 and 10 pixels per step.

DESCRIPTION OF THE PREFERRED EMBODIMENTS

The present encoding system and method may generally be employed to efficiently code images for transmission or storage. By way of example, the encoding scheme may be used to code images for efficient transmission to a printer, facsimile, or simply for database file storage. However, to facilitate discussion, the present invention will be explained within the context of printer data compression.

Figure 1:
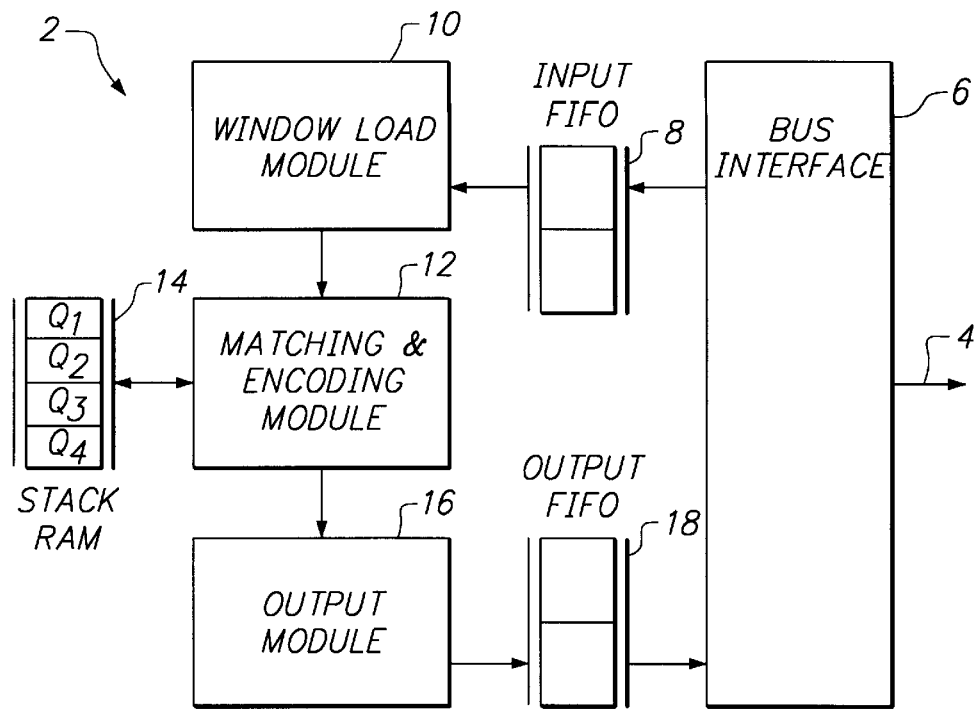
FIG. 1 is a general top level block diagram of the image compression unit, which accordingly to one exemplary embodiment, may be employed to implement the present invention.

FIG. 1 illustrates an overall block diagram of a compression unit (2) in which the present invention might be implemented. The compression unit (2) may preferably be implemented on a single integrated circuit chip for enhanced performance and marketability. Yet, as those having skill in the art will readily appreciate, the functions described herein may be implemented using any combination of distinct units, or by one software-driven general purpose unit.

The functions performed by the compression unit (2) may be divided into the four following principal tasks: 1) image loading; 2) step rate selection; 3) matching and encoding; and 4) output and formatting. Broadly speaking, the image loading function is performed by the input FIFO (8) and window load module (10), and serves to download windows of image data from system DRAM (not shown) for processing by the matching and encoding module (12). The step rate selection function examines the size of the windows downloaded by the window load module (10), and changes the window length to coincide with any detected repetition of image data from one window to the next. The matching and encoding function performs the actual task of encoding the windows. And last, the output function converts the coded windows into a format suitable for output. These functions will become clear from the ensuing detailed discussion.

Image Loading

As shown in FIG. 1, the compression unit (2) is connected to a system bus (4) via bus interface (6). In an exemplary embodiment, the compression unit functions as a slave processor, and compresses data when so commanded by the host system.

When so instructed, the compression unit (2) downloads a strip of image data from system DRAM (not shown) for storage in the input FIFO (8). Particularly, the input FIFO (8) includes two memory sections. The first section of the FIFO (8) is filled first, upon which a FIFO Valid bit is set. The compression unit (2) then attempts to fill the second section of the FIFO (8), depending on the availability of the bus.

Figure 2:
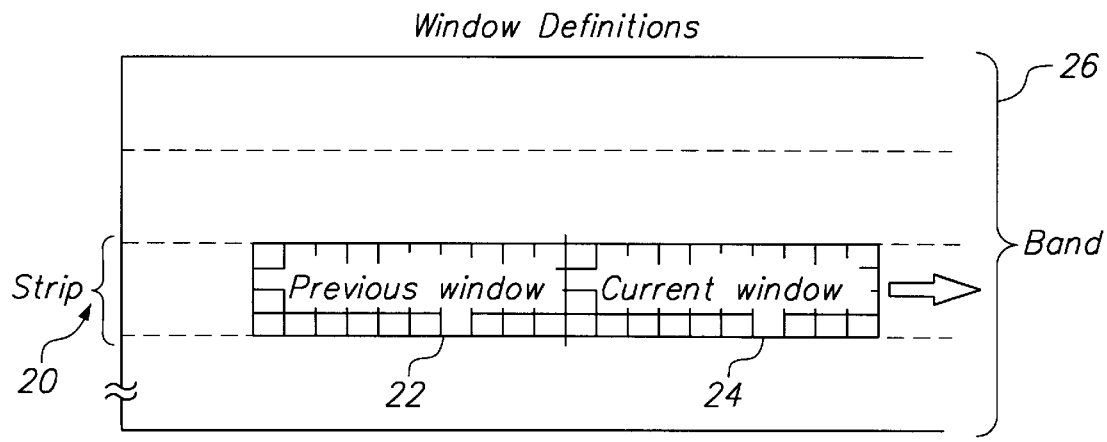
FIG. 2 illustrates various data unit definitions used in the specification.

Upon detecting a FIFO Valid bit, the window loading module (10) loads a block of data, referred to as a window, from the input FIFO (8). A window of image data may be best understood with reference to FIG. 2. As shown therein, a page of image data stored in system DRAM comprises a plurality of bands (26), which may be broken down into strips (20) having four raster lines each in width. A window (e.g. 24) is a portion of the strip (20), typically having a length of 6, 8 or 10 pixels in an exemplary embodiment. Furthermore, although not shown in FIG. 2, each pixel within the window is coded using three bits. These three bits can be used to identify eight different values for each pixel. Five of these values are allocated to describing five gray levels of image. One value is used to identify a bilevel (solid black) text pixel. Another value identifies a bilevel image pixel. The remaining value describes a white pixel. Accordingly, each window may be viewed as three-dimensional. The window width consists of four raster lines of information, the length consists of either 6, 8 or 10 pixels, and the depth consists of the three bit value used to code the value of the pixel.

Windows are moved across the 4-row strip (20) of pixels at a step rate of 6, 8 or 10 pixels. The window load module (10) continues to sequence through the strip (20) until it has read all of the image data stored in the first section of the input FIFO (8). The window load module (10) then resets the FIFO valid bit to instruct the FIFO (8) to provide more data. If the second half of the FIFO (8) has been loaded, as described above, the FIFO switches in ping-pong fashion to that data and once again sets the FIFO Valid bit. The window load module (10) then proceeds to read from the second half of the input FIFO (8).

Finally, at the end of each strip within a band, the input FIFO (8) is flushed and reloaded from the start of a new strip.

Step Rate Selection

Figure 3A:
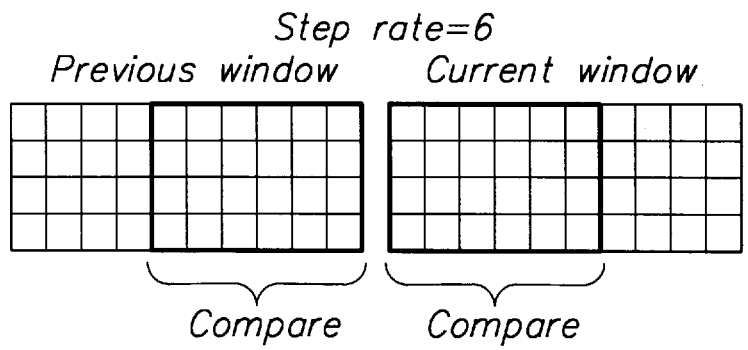
FIGS. 3(a), 3(b) and 3(c) illustrate the basis for comparison between blocks of data using step rates of 6, 8 and 10 pixels per step, respectively.
Figure 3B:
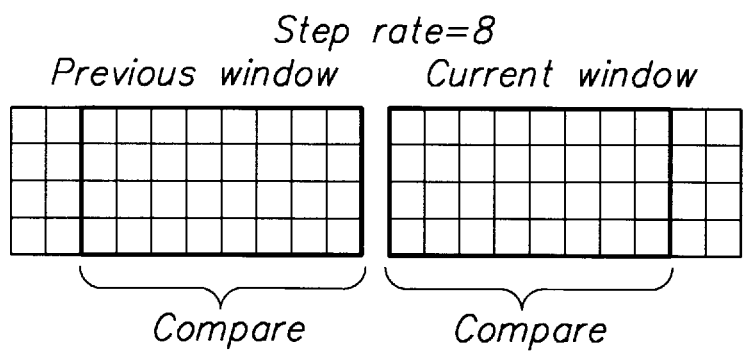
Figure 3C:
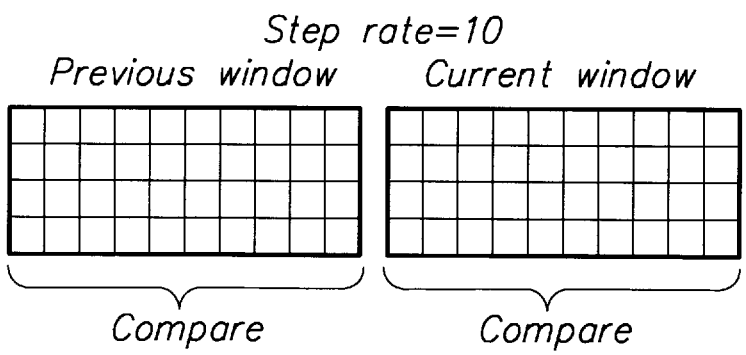

Once the windows are loaded, the matching and encoding module (12) comes into play by first checking for an exact match between pixels in a current window (24) and pixels in the window which immediately preceded the current window—referred to as the previous window (22). Often, printed data will exhibit a repetitious nature depending on the nature of the font used to generate the text or the half-tone matrix that was used to render the image. Accordingly, the current and previous windows are compared using the different step rates (6, 8 and 10 pixels) in an attempt to identify this natural repetition. FIGS. 3(a),(b) and (c) illustrate the specific basis for comparison using step rates of 6, 8 and 10, respectively.

The step rate of the window loading logic may initially be set at 8 pixels per step. If the above comparison step indicates that this step rate is out of sync with the natural cycle of data in the strip, the step rate is changed. FIG. 4 provides a truth table indicating the specific manner in which the step rate is changed. For instance, in the case where the step rate is initially set at 8, a match at window length of 8 will require no change in the step rate. However, if a match occurs at a window length of 6 pixels, then the table instructs the compression unit (2) to switch to a lower step rate of 6. Similarly, if a match occurs at a window length of 10 pixels, then the table instructs the system to switch to a higher step rate of 10. If none of the step rates produces a match, then the table instructs the system to maintain the current step rate. Furthermore, if there is a match for a specific window which comprises all white or all black pixels (denoted in the table as CV* for "Constant Value"), the table instructs the system to maintain the current step rate. More specifically, in the event of a constant value window, a change in step rate is inhibited to allow a more consistent lock on the half-tone frequency.

Matching and Encoding

Having chosen the step rate, the matching and encoding module (12) begins the task of actually coding the windows for transmission. It begins by dividing the window into quadrants, as denoted as step S2 in FIG. 5, and as illustrated schematically in FIG. 6 (showing quadrant divisions using a step rate of 6 pixels per step).

In general, the matching and encoding module (12) employs three principal hierarchical phases in coding the quadrants. First, the module (12) compares a current quadrant from the current window with the corresponding quadrant from the previous window. If a match is found, pixel values comprising the current quadrant do not have to be included in the output data stream.

If a match is unavailing, however, the encoding module (12) enters the second phase of its examination. In the second phase, the unmatched current quadrant is compared with a stored list of previously encountered image quadrants, starting from the second-to-last recently encountered image quadrant (the immediately preceding image quadrant having already been checked, as described above). If a match is found between the current quadrant, and an entry on the list, then the quadrant is coded by making reference to the entry on the list.

If a match is still unavailing, the encoding module (12) enters the third phase of its examination. In the third phase, the unmatched current quadrant is examined to determine if it falls into one of the following categories: bilevel text, bilevel image, one-gray value image, and multiple gray value image (to be described in more detail below). If so, the image is assigned a code corresponding to its ascertained classification. For instance, if the quadrant consists only of bilevel text, only the most significant bits of the 3-bit pixels are transmitted, thereby significantly reducing the quantity of information included in the output data stream.

Figure 8:
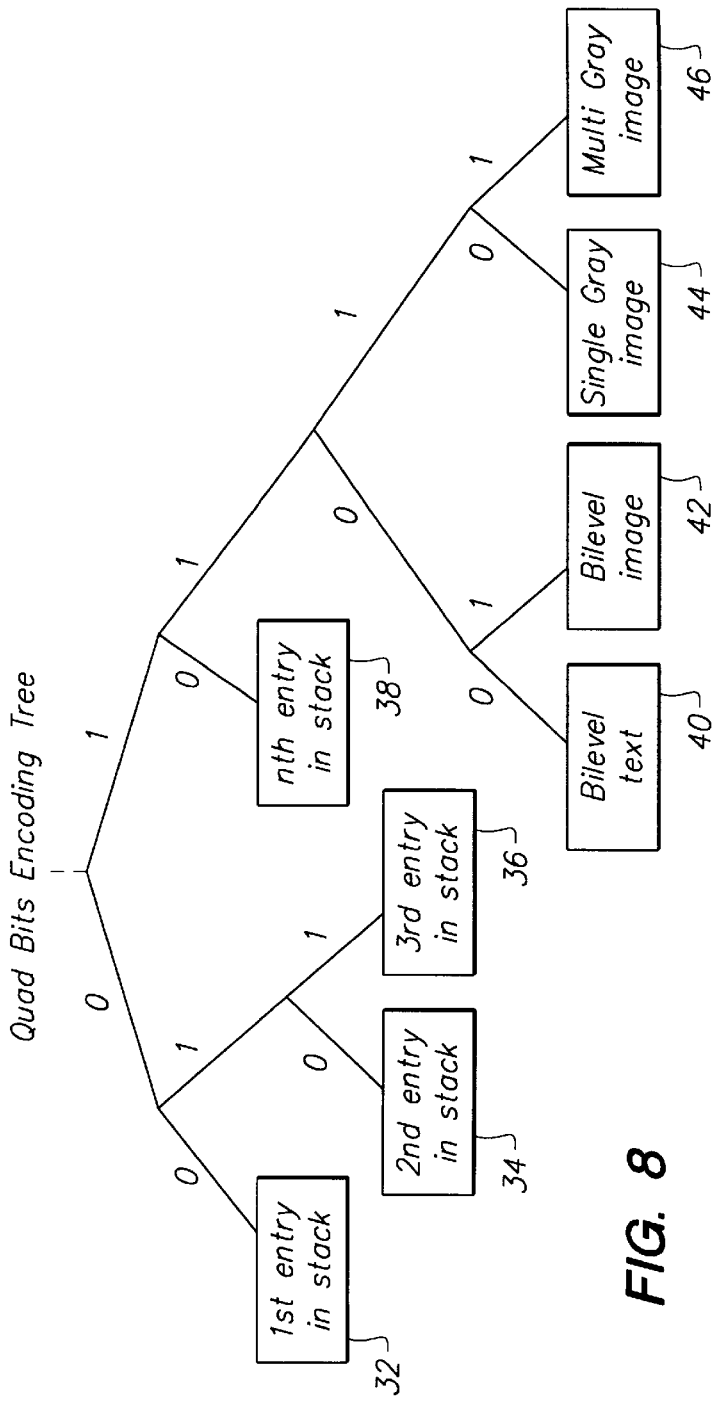
FIG. 8 shows a tree level representation of different quadrant bit matching possibilities.

The overall goal of the matching and encoding module (12) is to assign the shortest code possible to each quadrant. This is accomplished using a form of Huffman encoding, as illustrated in FIG. 8. All of the different situations that might be encountered within a window quadrant are classified into a predetermined number of categories, or possibilities (32–46), which from the terminal parts of an encoding tree. Each quadrant possibility (32–46) is assigned a code, which may be determined by tracing the encoding tree from its root to one of the quadrant possibilities (32–46). The code is assembled from the individual bits assigned to each branch of the tree. According to a particularly beneficial feature of the present invention, the shortest codes are allocated to the most frequently occurring quadrant possibilities. For instance, the current window has the highest probability of matching the immediately proceeding window. In this circumstance, the encoding module (12) simply informs the decoding module (not shown) of this fact, and does not transmit any of the pixel values in the matching quadrant. The next highest probability corresponds to the second-to-last encountered image quadrant, represented as (32) in FIG. 8, and coded as [00]. The next highest probability of match correspond to the third-to-last encountered image quadrant (34), and then the fourth-to-last image quadrant (36), which are coded as [010] and [011], respectively. If the matching and encoding module fails to find a match in a previous quadrant, it will then classify the quadrant as bilevel text (40), bilevel image (42), single gray image (44) or a multiple gray image, assigned the codes [1100], [1101], [1110] and [1111], respectively. Note that the possibilities corresponding to the highest probabilities are assigned the shortest codes.

Having presented an overview of the functions performed by the encoding module (12), each of the three above-identified principal phases will be discussed in detail.

Figure 5:
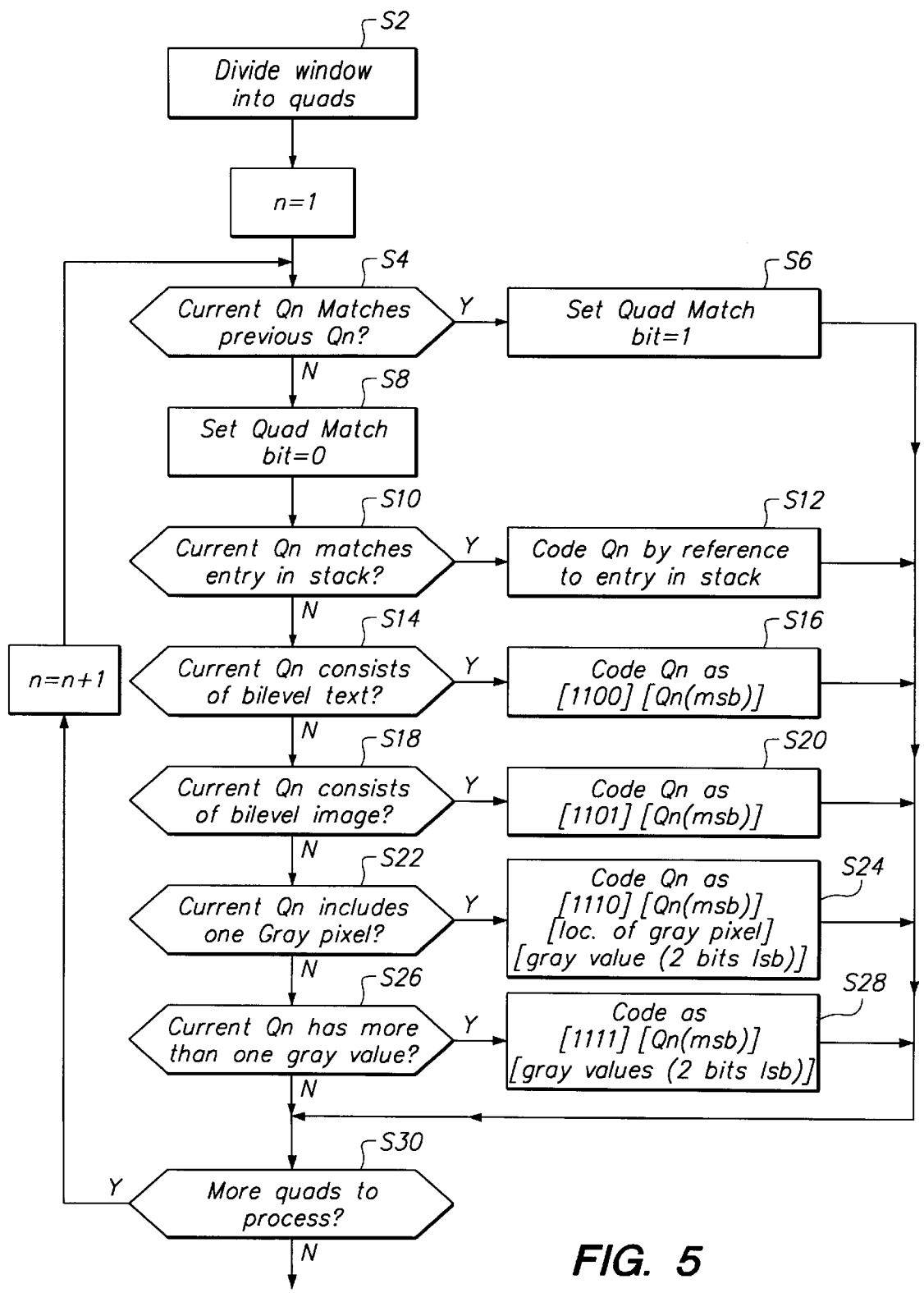
FIG. 5 is a flow chart indicating the principal steps in the algorithm performed by the matching and encoding module (12).
Figure 6:
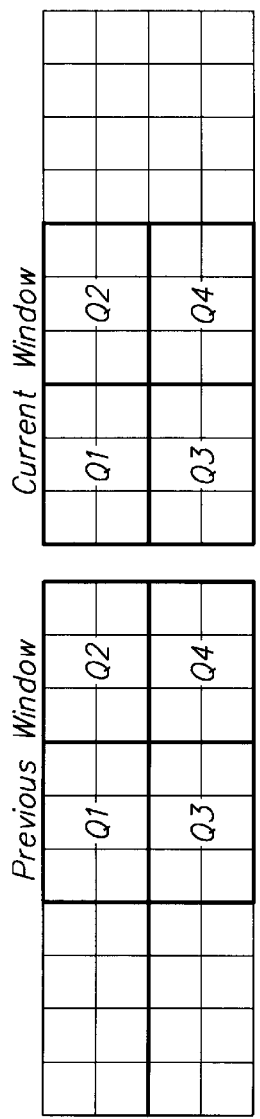
FIG. 6 illustrates the division of a window into quadrants.

As part of the first phase, the matching and encoding module ((12 in FIG. 1)) compares a quadrant taken from the current window with its respective counterpart quadrant taken from the previous window (step S4 in FIG. 5). If they match, a Quad Match bit corresponding to that quadrant is set to 1 (Step S6). Otherwise, this bit is set to 0 (Step S8). This procedure is repeated for the quadrants to produce a series of Quad Match bits. Only the image data within the quadrants assigned a Quad Match bit of 0 need to be transmitted in the output data stream. Furthermore, if the series of Quad Match bits duplicates a previous series of Quad Match bits, these bits do not have to be transmitted.

Specific exemplary coding for these two situations follows:

(1) Encoding in the case of unmatching Quad Match Bits: [1] [Quad Match bits] [Q1][Q2][Q3][Q4]

(2) Encoding in the case of matching Quad Match Bits: [0] [Q1][Q2][Q3][Q4]

Here, Q1–Q4 represents the pixel data contained within quadrants 1–4, respectively. As noted above, if one of the Quad Match bits indicates that one of the quadrants matches its counterpart from the previous window, that quadrant does not have to be transmitted with the output data stream. For example, if the Quad Match bits are [1010], the image data for the quadrants Q1 and Q3 are not included in the output data stream.

In the case (1) of encoding for the case of unmatched Quad Match bits, the current set of Quad Match bits does not match the previous set of Quad Match bits. Therefore, the new series of Quad Match bits has to be transmitted. In the case (2) of encoding for the case of matched Quad Match bits, the current set of Quad Match bits matches the previous set of Quad Match bits. Therefore, the new series of Quad Match bits does not have to be transmitted. Cases (1) and (2) are distinguished by using the prefix codes [1] and [0].

Figure 7:
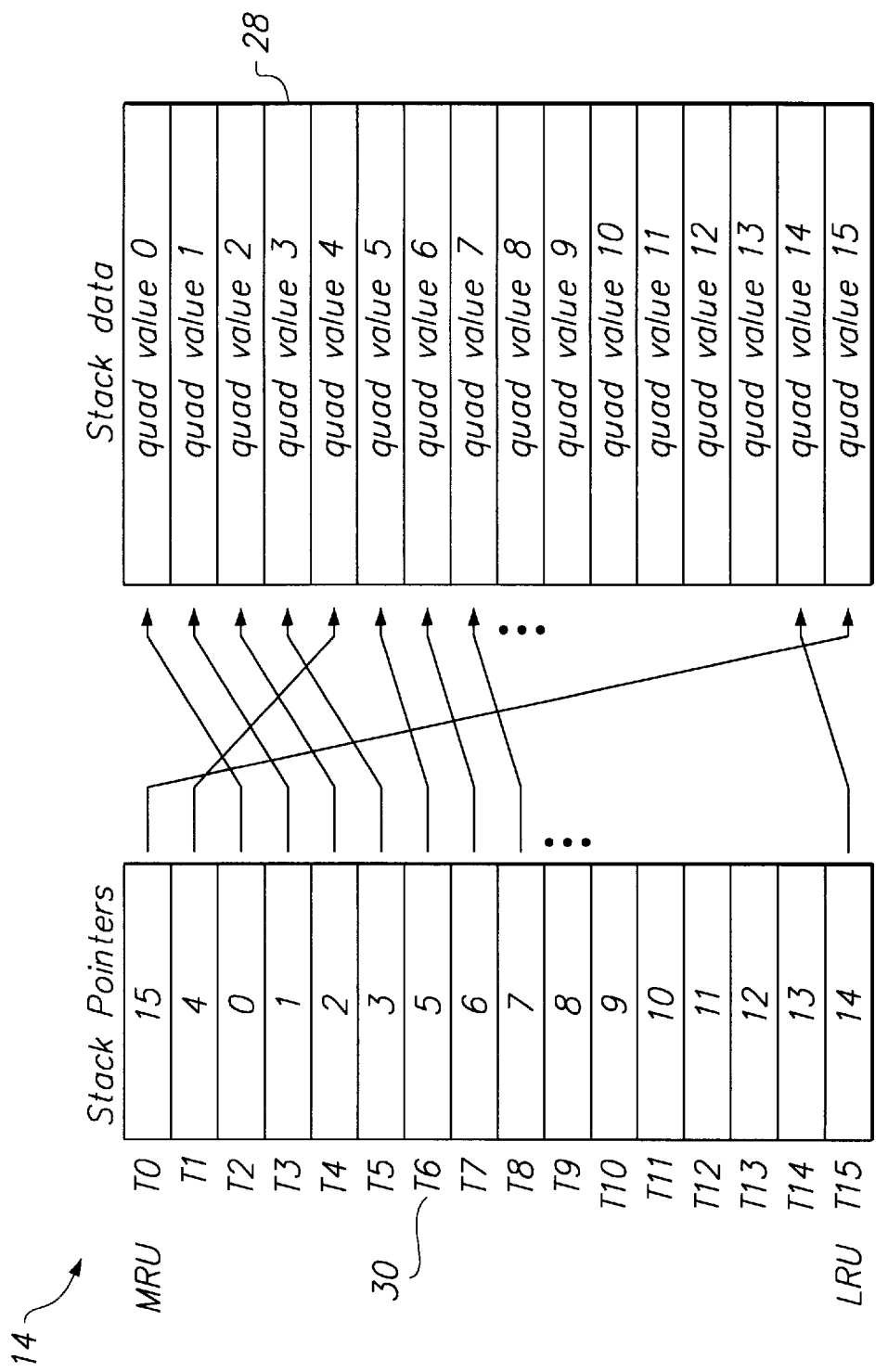
FIG. 7 shows the organization of the information in one of the four sections of the stack RAM (14).

In attempt to further compress the current window, the unmatched quadrants are compared with a stack (14) containing a list of most recently used image data (step S10 of FIG. 5). The stack (14) is specifically comprised of four different stacks, each holding data corresponding to quadrants 1–4, respectively. As illustrated in FIG. 7, each of the four stacks consists of 16 elements storing data (28) corresponding to the last 16 image quadrants encountered. Any item in the stack can be promoted to the most recently used position—or top—of the stack. Any new item inserted into the stack causes the least recently used item (LRU) to conceptually fall off the bottom of the stack and all other items to shift down one position. In this manner, each quadrant stack eventually contains the 16 most recently used quad bit values for that specific quadrant in order from most recently used (MRU) to least recently used (LRU).

As readily understood by those skilled in the art, the stack data is not actually shifted in response to promotion or demotion of entries in the stack. Rather, pointers (30) to the stack entries are manipulated to indicate the ordering of the stack. For instance, an item may be promoted from any level within the stack to the MRU by loading the pointer from that level, Tn, into the T0 slot, and shifting all the pointers from T0 to Tn−1 down one level. Inserting a new item into the stack is essentially the same as promoting the pointer in T15 to the top and storing the new item's data at that pointer's location.

The matching and encoding module searches the selected stack from the most recently used data to the least recently used data. For instance, FIG. 7 indicates that a quadrant from one recently encountered window matched the entry stored in "quad value 4". At the time of the match, a pointer to quad value 4 was stored in position T0 of the pointer table (30). In a subsequent window, however, the stack did not contain a match for the current quadrant. This resulted in storing the nonmatched quadrant at location 15, promoting location 15 to the top of the pointer list, and shifting the match for quadrant value 4 down one level to location T1 in the pointer table (30).

If in fact a quadrant from the current window matches a quadrant stored in the stack, the current quadrant is coded (Step 12) according to the following rules:

(3) Encoding of quad if matching 1st entry in stack: [00]

(4) Encoding of quad if matching 2nd entry in stack: [010]

(5) Encoding of quad if matching 3rd entry in stack: [011]

(6) Encoding of quad if matching 4th–16th entry in stack: [10] [4-bit stack index]

The specific codes assigned to each match derive from the Huffman tree encoding of the different permutations of quadrant bits, as illustrated in FIG. 8, and as discussed above.

Finally, if the quadrant data does not match a previous window and is further not found in the stack, the actual bit data must be sent. However, if all of the data in the quad is bilevel, only the most significant bit of each pixel need to be sent to define the quadrant (steps S14 and S16 in FIG. 5). If the bilevel data is all text then the coding is as follows:

(7) Encoding for bilevel text quad: [1101] [bilevel quad bit values]

Again, the specific code [1100] is derived from the Huffman tree encoding as outlined in FIG. 8. The quad bit values consist of only the most significant bit of each pixel, to indicate whether the respective pixels are black or white.

If the bilevel quadrant contains at least one bilevel image pixel, then the entire quadrant is coded as a bilevel image (steps S18 and S20). Any bilevel text contained with this quadrant is coded as bilevel image data. From the standpoint of pixel values, bilevel image data is the same as bilevel text data. For example, each pixel in both cases is coded as either black or white. It is possible, therefore, to encode all bilevel image data together. However, in some situations image data undergoes processing that is not carried out on text data, and vice versa. For example, image enhancement techniques, such as anti-aliasing, might be performed on text data after it is decoded, but are typically not carried out with respect to image data. For this reason, it is preferable to encode bilevel image data separately from the text. Bilevel image data may be discriminated from bilevel text by assigning a tag to the data at the time of creation (according to one example). Again it is emphasized that the term "bilevel text" encompasses not only text data, but also text-like data (such as graphical art). Generally speaking, "bilevel text" data is everything that is not "bilevel image" data.

The specific coding for bilevel imaging is a follows:

(8) Encoding for bilevel image quad: [1101] [bilevel quad bit values]

Again, the quad bits values consist of only the most significant bit of the 3-bit pixel values.

If the quadrant contains only one gray pixel value among the black and white pixels (step S22), the coding for the quadrant includes a location index providing the location of the gray value within the quadrant, as well as the gray pixel's least two significant bits (step 24). Also, the values of the bilevel data must be transmitted. The complete coding is as follows:

(9) Encoding for one gray value quad: [1110] [bilevel quad bit values] [location index] [gray value]

Finally, if the quadrant contains more than one gray value, it is more effective to simply transmit the complete quadrant, rather than specifying the location of the gray values within the quadrant (steps S26 and S28). Specifically:

(10) Encoding for multiple gray quad: [1111] [bilevel quad bit values] [2-bit least sig. bit values].

In addition to the above basic codes, the matching and encoding module produces two additional special codes. The first is to signal to the decoder (not shown) that a step change is required. This code is indicated as follows:

(11) Encoding for change in step rate: [1] [0011 or 1100] [1] [Q1][Q2][Q3][Q4]

The code [0011] is used to inform the decoder of a higher step rate, while the code [1100] is used to inform the decoder of a lower step rate. Again, Q1–Q4 refers to the quadrant bits for quadrants 1–4. respectively. In this mode, all Quad Match bits are forced to [0000] and not included in the data stream.

A second special situation occurs when the Quad Match bits resemble the encode lower or encode higher bits identified above—[1100] or [0011], respectively. To distinguish this situation from the preceding case, the Quad Match bits are followed by a 0-bit to indicate that this really is a normal new tree encoding and not a step rate change. The code is thus as follows:

(12) Encoding for special situation: [1] [Quad Match bits] [0] [Q1][Q2][Q3][Q4].

Output and Formatting

Once the matching and encoding module has completed its task, it looks to see if the output module has set a barrel_ready signal, indicating that the barrel shifter (not shown) of the output module (16) is ready to receive the coded data stream. If so, the coded data stream is forwarded to the output module (16) which packs the data into 32-bit words to be loaded into the output FIFO (18) using the barrel shifter.

The output module (16) forwards the expanded codes to the output FIFO (18), which like the input FIFO, contains two memory sections. While one section is being loaded by the barrel shifter, the other section, if full, is written out to the system DRAM. The output FIFO sets an output FIFO full bit to inform the interface logic to write the output bit stream to the system DRAM.

The present invention with its novel encoding scheme has been described in full within the exemplary context of printer data compression. However, as discussed above, the present invention is not limited to encoding printable data.

Further, various changes and modifications will be apparent to those skilled in art. Unless these modifications and changes depart from the scope and spirit of the present invention, they are considered encompassed by the present invention. For instance, the order of steps given in FIG. 5 is not crucial to the inventive premise, nor are the particular choice of coding prefixes or window lengths.

What is claimed is:

1. A system for encoding a digital image of the type in which each pixel of the image is defined by a multiple bit value, including:
   a loading module for identifying a grouping of pixels within said digital image;
   an encoding module for identifying the type of data contained within said grouping as either bilevel data or multilevel data, and coding said grouping to indicate the type of data so identified and the pixel values such that, for bilevel data, the pixels of the grouping are encoded by means of a single bit value and, for multilevel data, the individual value of at least one pixel of the grouping is encoded by means of a multi-level value represented by multiple bits wherein said encoding module further divides said grouping into a plurality of subgroupings, and codes each subgrouping separately depending on the type of data contained within said subgrouping; and
   an output for outputting the encoded image grouping.

2. A system for encoding a digital image as claimed in claim 1, wherein said encoding module encodes said grouping as a bilevel text grouping when said type of data contained within said grouping consists of only bilevel text data.

3. A system for encoding a digital image as claimed in claim 1, wherein said encoding module encodes said grouping as a bilevel image grouping when said type of data contained within said grouping consists of at least one bilevel image datum.

4. A system for encoding a digital image as claimed in claim 1, wherein said encoding module classifies said grouping as a singular gray level grouping and encodes said grouping to indicate said classification when said type of data contained within said grouping contains only one gray level datum.

5. A system for encoding a digital image as claimed in claim 4, wherein said encoding module encodes said singular gray level grouping by specifying the location of the gray level datum within the grouping in conjunction with a gray level magnitude.

6. A system for encoding a digital image as claimed in claim 1, wherein said encoding module classifies said grouping as a multiple gray level grouping and encodes said grouping to indicate said classification when said type of data contained within said grouping contains more than one gray level datum.

7. A method for encoding a digital image as claimed in claim 1, wherein said encoding step classifies said grouping as a multiple gray level grouping and encodes said grouping to indicate said classification when said type of data contained within said grouping contains more than one gray level datum.

8. A method for encoding a digital image of the type in which each pixel of the image is defined by a multiple bit value, comprising the steps of:
   identifying a grouping of pixels within said digital image;
   identifying the type of data contained within said grouping as either bilevel data or multilevel data;
   coding said grouping to indicate the type of data so identified and the pixel values such that, for bilevel data, the pixels of the grouping are encoded by means of a single bit value and, for multilevel data, the individual value of at least one pixel of the grouping is encoded by means of a multi-level value represented by multiple bits;
   dividing said grouping into a plurality of subgroupings, and coding each subgrouping separately depending on the type of data contained within said subgrouping; and
   outputting the encoded image grouping.

9. A method for encoding a digital image as claimed in claim 8, wherein said coding step encodes said grouping as a bilevel text grouping when said type of data contained within said grouping consists of bilevel text data.

10. A method for encoding a digital image as claimed in claim 8, wherein said coding step encodes said grouping as a bilevel image grouping when said type of data contained within said grouping consists of at least one bilevel image datum.

11. A method for encoding a digital image as claimed in claim 8, wherein said encoding step classifies said grouping as a singular gray level grouping and encodes said grouping to indicate said classification when said type of data contained within said grouping contains only one gray level datum.

12. A method for encoding a digital image as claimed in claim 11, wherein said coding step encodes said singular gray level grouping by specifying the location of the gray level datum within the grouping in conjunction with a gray level magnitude.

13. A system for encoding a digital image including:

a loading module for identifying a current image grouping within said digital image;

a matching and encoding module for comparing said current image grouping with a previous image grouping, and coding said current image grouping as a matched image grouping when the current image grouping matches a previous image grouping, else coding said current image grouping as a nonmatched image grouping;

said matching and encoding module further identifying the type of data contained within said nonmatched image grouping as either bilevel data or multilevel data, and providing coding for said nonmatched image grouping on the basis of the type of data so identified;

an output module for outputting the encoded image grouping.

14. A system for encoding a digital image as claimed in claim 13, wherein said previous grouping comprises a prior grouping processed by said matching and encoding module.

15. A system for encoding a digital image as claimed in claim 14, wherein said prior grouping consists of the immediately preceding grouping processed by the system.

16. A system for encoding a digital image as claimed in claim 13, wherein said system further includes:

a stack memory containing a list of previous groupings processed by the system;

and wherein said matching and encoding module further compares said nonmatched grouping with entries contained in said list.

17. A system for encoding a digital image as claimed in claim 13, wherein:

said matching and encoding module encodes said nonmatching grouping as a bilevel text grouping when it contains bilevel text data;

said matching and encoding module encodes said nonmatching grouping as a bilevel image grouping when it contains entirely bilevel image data;

said matching and encoding module encodes said nonmatching grouping as a singular gray level grouping when it contains only one gray level datum; and said matching and encoding module encodes said nonmatching grouping as a multiple gray level grouping when it contains more than one gray level datum.

18. A system for encoding a digital image as claimed in claim 13, wherein said matching and encoding module employs Huffman encoding.

19. The system of claim 13, wherein said matching and encoding module encodes a nonmatched image grouping to indicate the type of data identified for that grouping and the values of image pixels within the grouping such that for bilevel data, the pixels of the grouping are encoded by means of a single-bit value and, for multilevel data, at least one pixel of the grouping is encoded by means of a multi-bit value.

20. A method for encoding a digital image including:

identifying a current image grouping within said digital image;

comparing said current image grouping with a previous image grouping;

coding said current image grouping as a matched image grouping when the current image grouping matches a previous image grouping, else coding said current image grouping as a nonmatched image grouping;

identifying the type of data contained within said nonmatched image grouping as either bilevel data or multilevel data;

providing coding for said nonmatched image grouping on the basis of the type of data so identified;

outputting the encoded image grouping.

21. A method for encoding a digital image as claimed in claim 20, wherein said previous grouping comprises a prior grouping processed by said encoding method.

22. A method for encoding a digital image as claimed in claim 21, wherein said prior grouping consists of the immediately preceding grouping processed by said encoding method.

23. A method for encoding a digital image as claimed in claim 20, further comprising the steps of:

comparing said nonmatched grouping with a stack containing a list of prior groupings; and coding said nonmatched grouping by reference to a corresponding item in said list, if it is determined that said nonmatched grouping corresponds with said item.

24. A method for encoding a digital image as claimed in claim 20, wherein:

said step of providing coding for said nonmatched image grouping encodes said nonmatching grouping as a bilevel text grouping when it contains entirely bilevel text data;

said step of providing coding for said nonmatched image grouping encodes said nonmatching grouping as a bilevel image grouping when it contains bilevel image data;

said step of providing coding for said nonmatched image grouping encodes said nonmatching grouping as a singular gray level grouping when it contains only one gray level datum; and said step of providing coding for said nonmatched image grouping encodes said nonmatching grouping as a multiple gray level grouping when it contains more than one gray level datum.

25. A method for encoding a digital image as claimed in claim 20, wherein said coding steps employ Huffman encoding.

26. The method of claim 20, wherein a nonmatched image grouping is encoded to indicate the type of data identified for that grouping and the values of image pixels within the grouping such that for bilevel data, the pixels of the grouping are encoded by means of a single-bit value and, for multilevel data, at least one pixel of the grouping is encoded by means of a multi-bit value.

27. A method for encoding image data, comprising the steps of:

storing data in a stack which identifies values for plural groups of pixels in an image;

selecting a group of pixels within the image;

comparing pixel values for said selected group of pixels with data stored in said stack to determine whether the pixel values for said selected group match data for any group of pixels which is stored in said stack;

encoding the pixel values for said selected group as matching data stored in said stack when there is a match;

storing data which identifies the pixel values for the selected group in said stack when there is no match;

encoding the pixel values for the selected group as new pixel value data when there is no match; and reordering the data stored in said stack so that the plural groups are listed in order from the most recently selected group to the least recently selected group.

28. The method of claim 27 wherein said stack contains a predetermined maximum number of data entries.

29. The method of claim 28 further including the step of deleting the data entry relating to the least recently selected group from the stack when data for a currently selected group is stored in the stack upon a determination that there is no match.

30. A system for encoding a digital image, comprising:
 a selection module which groups pixels within the digital image;
 a classifier which classifies the groups of pixels into at least three data categories including bilevel text data, bilevel image data and multi-level image data;
 an encoding module which encodes the data for a group of pixels in accordance with its classification, to indicate the value of each of the pixels in said group; and
 an output module which receives and stores the encoded data for subsequent transmission.

31. The system of claim 30, wherein the encoding of bilevel text data and bilevel image data indicates the value of the pixels using a single bit, and identifies whether the pixels represent text or image data.

32. The system of claim 30, wherein said classifier further classifies multi-level image data into at least two categories including single multi-level value and plural multi-level values.

33. The system of claim 32, wherein said encoding module encodes a group which has been classified as containing a single multi-level value in a manner which identifies the location of a pixel having the multi-level value, as well as the magnitude of the value.

34. The system of claim 32, wherein said encoding module encodes a group which has been classified as containing plural multi-level values in a manner which identifies the value of each pixel in the group.

35. A system for encoding a digital image, comprising:
 a selection module which groups pixels within the digital image;
 a classifier which classifies the groups of pixels into at least three data categories including bilevel data, single-value multi-level image data and plural-value multi-level image data;
 an encoding module which encodes the data for a group of pixels in accordance with its classification, to indicate the value of each of the pixels in said group; and
 an output module which receives and stores the encoded data for subsequent transmission.

36. The system of claim 35, wherein said encoding module encodes a group which has been classified as containing a single multi-level value in a manner which identifies the location of a pixel having the multi-level value, as well as the magnitude of the value.

37. The system of claim 35, wherein said encoding module encodes a group which has been classified as containing plural multi-level values in a manner which identifies the value of each pixel in the group.

* * * * *